(12) United States Patent
Pradhan et al.

(10) Patent No.: US 9,076,188 B2
(45) Date of Patent: Jul. 7, 2015

(54) METHOD AND SYSTEM FOR SHIPMENT AUTHENTICATION

(75) Inventors: Salil Pradhan, San Jose, CA (US); Vinay Deolalikar, Mountain View, CA (US); Lester Ortiz, Camuy, PR (US); Aliplo Caban, Arecibo, PR (US); Geoff Lyon, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3225 days.

(21) Appl. No.: 11/105,065

(22) Filed: Apr. 13, 2005

(65) Prior Publication Data

US 2006/0233358 A1     Oct. 19, 2006

(51) Int. Cl.
H04L 29/06     (2006.01)
G06F 21/00     (2013.01)
G06Q 50/28     (2012.01)
G06Q 10/08     (2012.01)
H04L 9/08      (2006.01)

(52) U.S. Cl.
CPC ............... *G06Q 50/28* (2013.01); *G06Q 10/08* (2013.01); *H04L 9/085* (2013.01)

(58) Field of Classification Search
CPC ....... H04L 9/14; H04L 9/0852; H04L 9/0894; H04L 9/085
USPC .............. 713/170, 171, 168; 380/259; 705/50
See application file for complete search history.

(56) References Cited

U.S. PATENT DOCUMENTS 5,367,148 A     11/1994  Storch et al.
5,588,061 A     12/1996  Ganesan et al.
6,182,214 B1 *   1/2001  Hardjono ................. 713/163
6,996,543 B1 *   2/2006  Coppersmith et al. ........ 705/50
7,200,752 B2 *   4/2007  Eskicioglu ................ 713/181
7,283,630 B1 *  10/2007  Doljack .................... 380/55

(Continued)

FOREIGN PATENT DOCUMENTS

GB          2342743 A  *  4/2000

OTHER PUBLICATIONS

Dr. Andrew D. Dubner—"Securing the Pharmaceutical Supply Chain—The Authenticated RFID Platform"—3M White Paper—Jun. 2005—8 pages.

*Primary Examiner* — Izunna Okeke
(74) *Attorney, Agent, or Firm* — Olympic Patent Works

(57) ABSTRACT

In one embodiment of the present invention, a source point of a supply chain secures shipment of an object by devising an encryption key and encrypting a message using the encryption key to produce an encrypted message. A portion or portions of the encryption key and the encrypted message are included or incorporated within the object to be shipped, packaging surrounding the object, and/or labels affixed to the object or packaging, prior to shipping the object to a destination point within the supply chain. Upon receipt of the object from the supply chain, the destination point can extract the portion or portions of the encryption key and the encrypted message from the object, packaging surrounding the object, and/or labels affixed to the object or packaging, obtain the remaining portion of the encryption key directly from the source point, reassemble the encryption key, and decrypt the encrypted message to produce a computed message. The destination point can then obtain the original message from the source point and compare the original message to the decrypted message in order to determine whether or not the shipment is authentic.

11 Claims, 9 Drawing Sheets

(56) References Cited

U.S. PATENT DOCUMENTS

| | | |
|---|---|---|
| 2004/0208316 A1 | 10/2004 | Wack et al. |
| 2005/0097054 A1* | 5/2005 | Dillon ............................. 705/51 |
| 2005/0108044 A1* | 5/2005 | Koster ............................. 705/2 |
| 2005/0259818 A1* | 11/2005 | Silverbrook et al. ........... 380/55 |
| 2005/0261937 A1* | 11/2005 | Silverbrook et al. ............. 705/2 |
| 2006/0053025 A1* | 3/2006 | Mertens ........................... 705/1 |

\* cited by examiner

METHOD AND SYSTEM FOR SHIPMENT AUTHENTICATION

TECHNICAL FIELD

The present invention is related to security and authentication, and, in particular, to the authentication of physical objects shipped through supply chains.

BACKGROUND OF THE INVENTION

Security of shipped objects in supply chains has been a problem for manufacturers, shippers, distributors, and recipients of shipped goods for thousands of years. Security issues have been addressed by many different techniques, including various types of seals, such as wax seals, markings and encodings, trusted distributors and distribution agencies, trademarks, armed guards, and, more recently, mechanical and electronic devices and computer-based systems for ensuring that an object sent from a source point in a supply chain reaches a destination point intact, untampered with, undamaged, and in a timely fashion. However, as methods for securing shipment of objects have evolved, methods used by counterfeiters and thieves to defeat security methods have also evolved. As a result, theft, counterfeiting, shipment delays, and shipment-routing problems continue to plague supply chains.

One important example of supply-chain-security problems in contemporary commerce is the shipment of pharmaceuticals from pharmaceutical manufacturers to various distributors and retail outlets. FIGS. 1 and 2 illustrate a pharmaceutical-supply-chain context used, in subsequent subsections, as one context for application of the methods of the present invention. In FIG. 1, a large pharmaceutical manufacturer 102 manufacturers pharmaceuticals that are shipped, in the case of FIG. 1, by rail 104 to a number of centralized distribution facilities, such as centralized distribution facility 106. From these centralized distribution centers, smaller shipments 108 of pharmaceuticals are made to a number of regional distribution centers, including regional distribution center 110 in FIG. 1, from which the pharmaceuticals are then shipped by local transport 112 to a number of local distribution centers, including local distribution center 114 in FIG. 1. The pharmaceuticals are finally distributed, by local transport 116, to a number of retail outlets, such as the drugstore 118 shown in FIG. 1. As shown in FIG. 2, the pharmaceuticals may be initially shipped in bulk 202 from the pharmaceutical manufacturer to centralized distribution facilities. The pharmaceuticals may be packaged into bottles at the centralized distribution facilities, and shipped in large packages 204 to regional distribution centers. In the regional distribution centers, the containers may be repackaged 206 into smaller-volume packages, in which the pharmaceuticals are distributed through the supply chain to local distribution centers, from which either small packages or individual bottles 208 of the pharmaceuticals may be distributed to retail outlets. At the retail outlet, pharmaceuticals may again be repackaged into familiar prescription bottles for individual consumers.

The pharmaceutical supply chain illustrated in FIGS. 1 and 2 is but one example of a myriad possible organizations of pharmaceutical supply chains. In some cases, the pharmaceuticals may be fully packaged by the manufacturer in the packaging in which the pharmaceuticals are intended to be delivered to retail outlets. In other cases, bulk powdered or liquid pharmaceuticals may be shipped by manufacturers to secondary drug manufacturers, where they are formed into pills, gelatin capsules, glass bottles with rubber septa for loading syringes, and other final drug products, and then distributed to the supply chain. Retail outlets are but one example of a destination point in a supply chain. In the pharmaceutical-supply-chain context, for example, other destination points include clinics, hospitals, government agencies, and other health care establishments.

Drug counterfeiting has become an increasingly common and increasingly dangerous problem for pharmaceutical manufacturers, distributors, retail outlets, health-care facilities, and consumers. Drug counterfeiters seek to insert falsely labeled, counterfeit pharmaceuticals into the supply chain at various intermediate points in the supply chain in between the manufacturer, or other trusted source point, and a destination point, such as a retail outlet. By doing so, the counterfeiters can circumvent patent rights, government oversight and quality standards, and other well-designed and protective barriers to entering the pharmaceuticals marketplace. However, counterfeit drugs may be either ineffective or dangerous. Therefore, manufacturers, distributors, retailers, and consumers of pharmaceuticals have all recognized the need for improved security techniques for ensuring that the pharmaceuticals received by retail outlets, consumers, and health-care facilities are the legitimate products shipped from trusted source points in the pharmaceutical supply chain, including manufacturers, secondary drug manufacturers, centralized distributors, and other trusted points in the pharmaceutical supply chain.

SUMMARY OF THE INVENTION

In one embodiment of the present invention, a source point of a supply chain secures shipment of an object by devising an encryption key and encrypting a message using the encryption key to produce an encrypted message. A portion or portions of the encryption key and the encrypted message are included or incorporated within the object to be shipped, packaging surrounding the object, and/or labels affixed to the object or packaging, prior to shipping the object to a destination point within the supply chain. Upon receipt of the object from the supply chain, the destination point can extract the portion or portions of the encryption key and the encrypted message from the object, packaging surrounding the object, and/or labels affixed to the object or packaging, obtain the remaining portion of the encryption key directly from the source point, reassemble the encryption key, and decrypt the encrypted message to produce a computed message. The destination point can then obtain the original message from the source point and compare the original message to the decrypted message in order to determine whether or not the shipment is authentic.

DETAILED DESCRIPTION OF THE INVENTION

The present invention is related to securing shipment of objects through supply chains. In described embodiments of the present invention, an encryption-based system is employed to allow the recipient of a shipment to authenticate the shipment based on information included or incorporated within the object shipped, or incorporated within or affixed to various, nested levels of packaging surrounding the object. First, basic cryptography is reviewed in the following subsection. Then, in a subsequent subsection, embodiments of the present invention are discussed.

Review of Basic Cryptography

Figure 3:
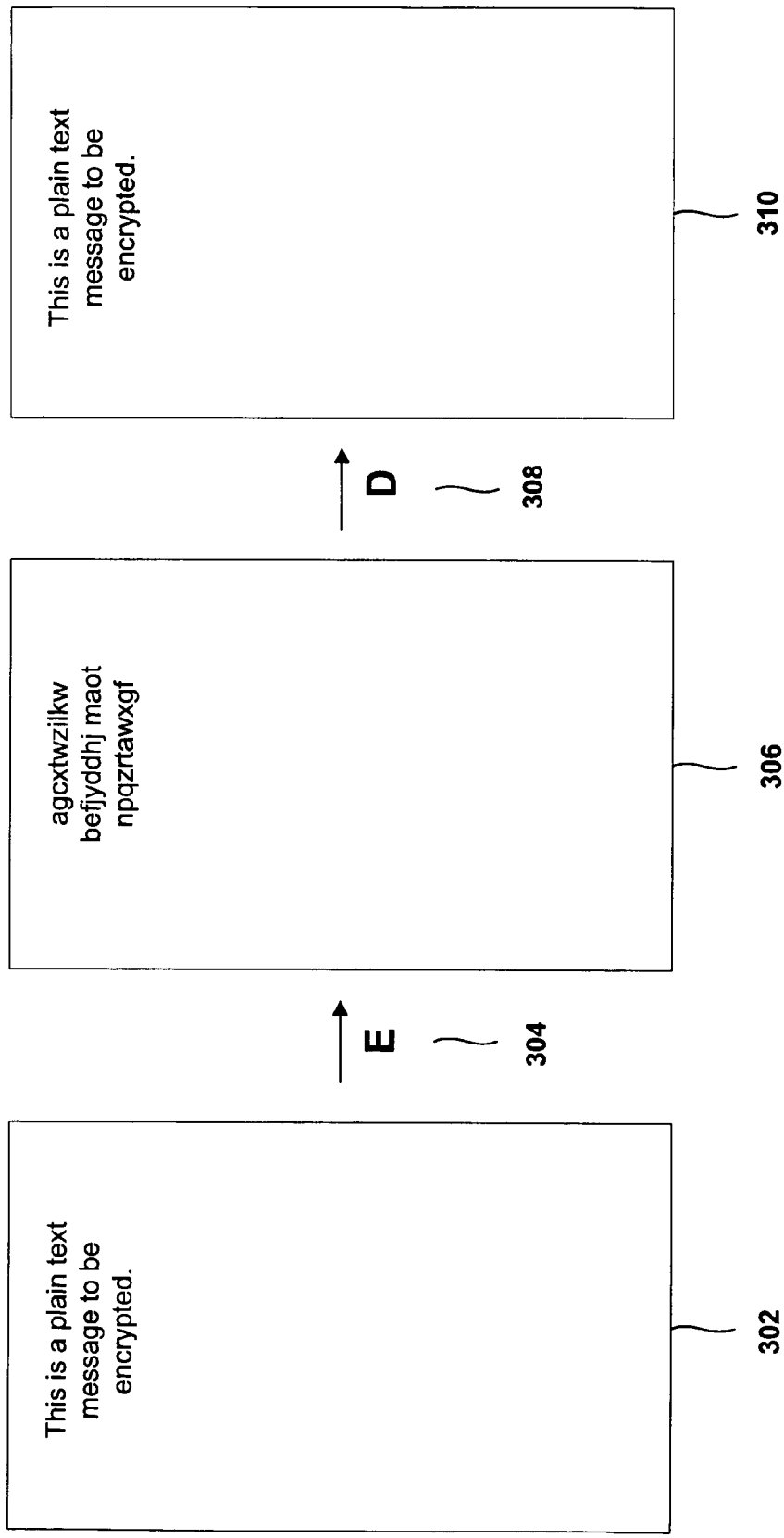
FIG. 3 illustrates a basic principle underlying cryptographic methodologies.

Certain embodiments of the present invention employ cryptographic methodologies in order to secure shipment of objects through supply chains. In this subsection, an overview of a number of basic cryptographic methods is provided. FIG. 3 illustrates a basic principle underlying cryptographic methodologies. Cryptography is designed to transform plain text information into encoded information that cannot be easily decoded by unauthorized entities. For example, FIG. 3 shows a plain text message 302 that includes an English-language sentence. This plain text message can be encrypted by any of various encryption functions E 304 into a corresponding cipher text message 306 that is not readily interpretable. An authorized user is provided with a decryption function D 308 that allows the authorized user to decrypt the cipher text message 306 back to the plain text message 310.

The basic cryptographic methods can be described using the following definitions:

$$A_m = \text{alphabet for messages} = \{a_{m_1}, a_{m_2}, a_{m_3} \ldots a_{m_n}\}$$

$$A_c = \text{alphabet for cipher} - \text{text} = \{a_{c_1}, a_{c_2}, a_{c_3} \ldots a_{c_n}\}$$

$$M = \text{message} - \text{space} = \text{strings of } a_m$$

$$C = \text{cipher} - \text{text space} = \text{strings of } a_c$$

$$K = \text{key space} = \{e_1, e_2 \ldots e_n\} \text{ where } E_{e_i}(m) \to c$$

$$= \{d_1, d_2 \ldots d_n\} \text{ where } D_{d_i}(d) \to m$$

Plain text messages are instances of messages contained within the message space M and cipher text messages are instances of the cipher text messages contained within cipher-text space C. A plain text message comprises a string of one or more characters selected from a message alphabet $A_m$, while a cipher-text message comprises a string of one or more characters selected from the cipher-text alphabet $A_c$. Each encryption function E employs a key e and each decryption function D employ a key d, where the keys e and d are selected from a key space K.

A key pair is defined as follows:

key pair=(e,d)

where e∈K, d∈K, $D_d(E_e(m))$=m, and m∈M.

One key of the key pair, e, is used during encryption to encrypt a message to cipher text via an encryption function E, and the other key of the key pair, d, can be used to regenerate the plain text message from the cipher-text message via a decryption function D. In symmetric key encryption, e and d are identical. In asymmetric, public-key cryptographic methods, key pairs (e,d) have the property that, for all key pairs (e,d), no function $f(e)$=d can be easily determined. Thus, the encryption key e of a public-key pair (e,d) can be freely distributed, because the corresponding decryption key d of the public-key pair cannot be determined from the encryption key e.

DESCRIBED EMBODIMENTS OF THE PRESENT INVENTION

Figure 4:
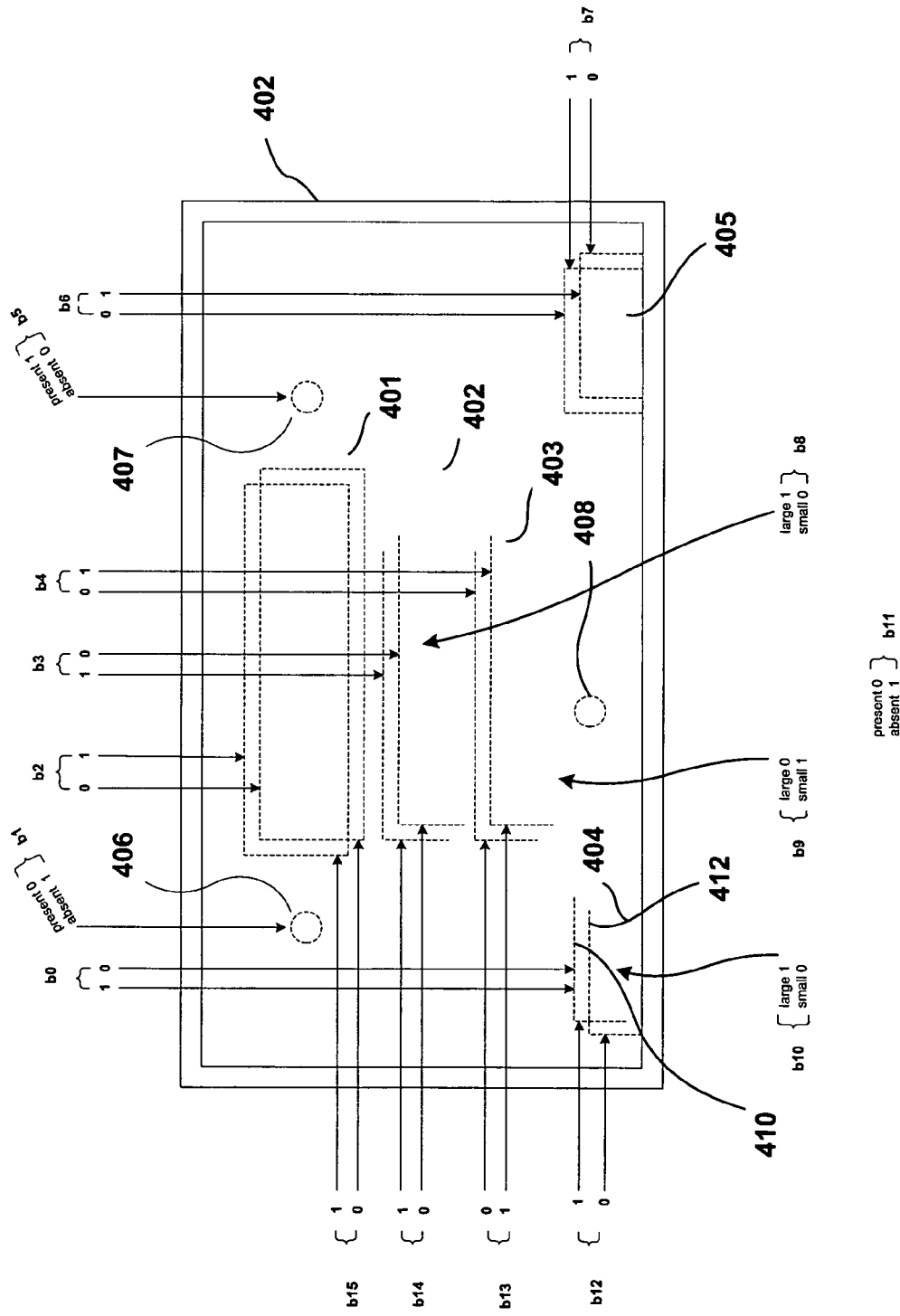
FIG. 4 illustrates an exemplary technique for encoding a 16-bit binary integer within a label.

Information may be encoded graphically into labels and other graphical objects and representations. FIG. 4 illustrates an exemplary technique for encoding a 16-bit binary integer within a label. The label 402 is a rectangular piece of paper, polymer, or other planar material on which label information is printed. In the exemplary label of FIG. 4, five text fields 401-405 are printed, along with optional printing of between zero and three dots, or filled disks, 406-408. The 16-bit integer is encoded by choosing 16 different features of the label, and providing two different choices for the features. For example, the first bit b0 of the 16-bit integer encodes whether or not the bottom-left text field 404 is printed at a first height 410 or a second height 412. When printed at the first height 410, bit b0 of the 16-bit integer has the value "1," and when printed at the second height 412, bit b0 has the value "0." The second bit, b1, of the 16-bit integer indicates whether or not the upper left dot, or filled disk, 406 is printed on the label. Similarly, each of the remaining 14 bits of the 16-bit integer are determined by the heights, horizontal offsets of the five text fields, presence or absence of dots 407 and 408, and the font size of the textual information printed in text fields 402-405, as indicated in FIG. 4.

Figure 5A:
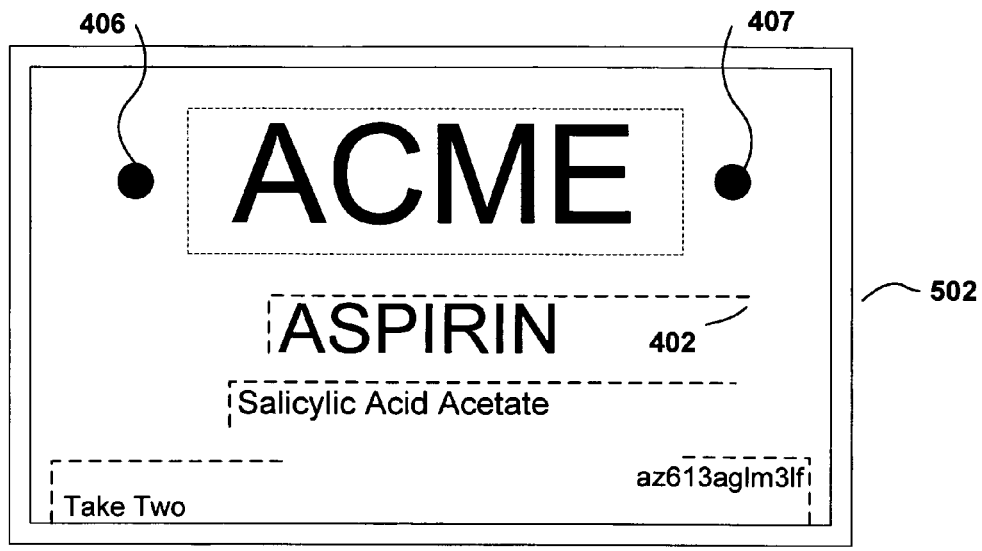
FIG. 5A shows one possible printing of the label, discussed above with reference to FIG. 4.
Figure 5B:
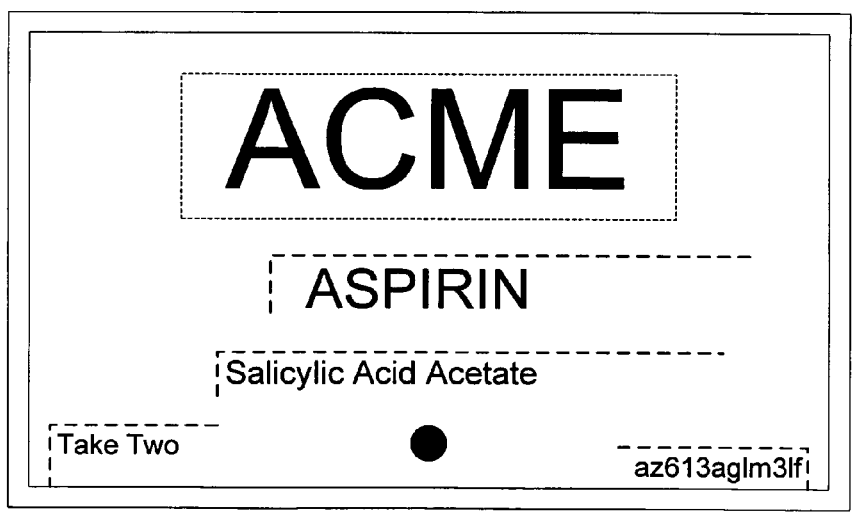
FIG. 5B shows an alternative printing of the label, discussed above with reference to FIG. 4.

FIG. 5A shows one possible printing of the label, discussed above with reference to FIG. 4. The label 502 is shown in FIG. 5A along with the corresponding 16-bit integer 504 that can be extracted from the label by noting which of the two variants for each of the features shown in FIG. 4 are used in the label. For example, the upper, left-hand dot 406 is printed on label 502. Therefore, bit b1 506 of the 16-bit integer 504 has the value "0," as shown in FIG. 4, indicating that the dot is printed. Similarly, the presence of the upper, right-hand dot 407 on the label is reflected in the value "1" for bit b5 508 in the 16-bit integer 504, again as indicated by the encoding scheme outlined in FIG. 4. The fact that a large font size was used to print the word "aspirin" in text field 402 is reflected by the value "1" for bit b8 510 of the 16-bit word 504. The values of each of the other bits of the 16-bit integer 504 similarly reflected in the printing-feature variants used to print the label 502. FIG. 5B shows an alternative printing of the label, discussed above with reference to FIG. 4. FIG. 5B shows an alternative printing of the label, with a different corresponding 16-bit integer reflecting the printing-feature variants used in the alternative printing. Although the features chosen for the current example are rather easily detected by visual inspection, far more subtle features can be used to encode information in a label for extraction by automated methods. Commonly used labels provide a plethora of printing features, the variants for which can be used to encode arbitrarily sized binary integers, or other numeric or textual information.

Figure 1:
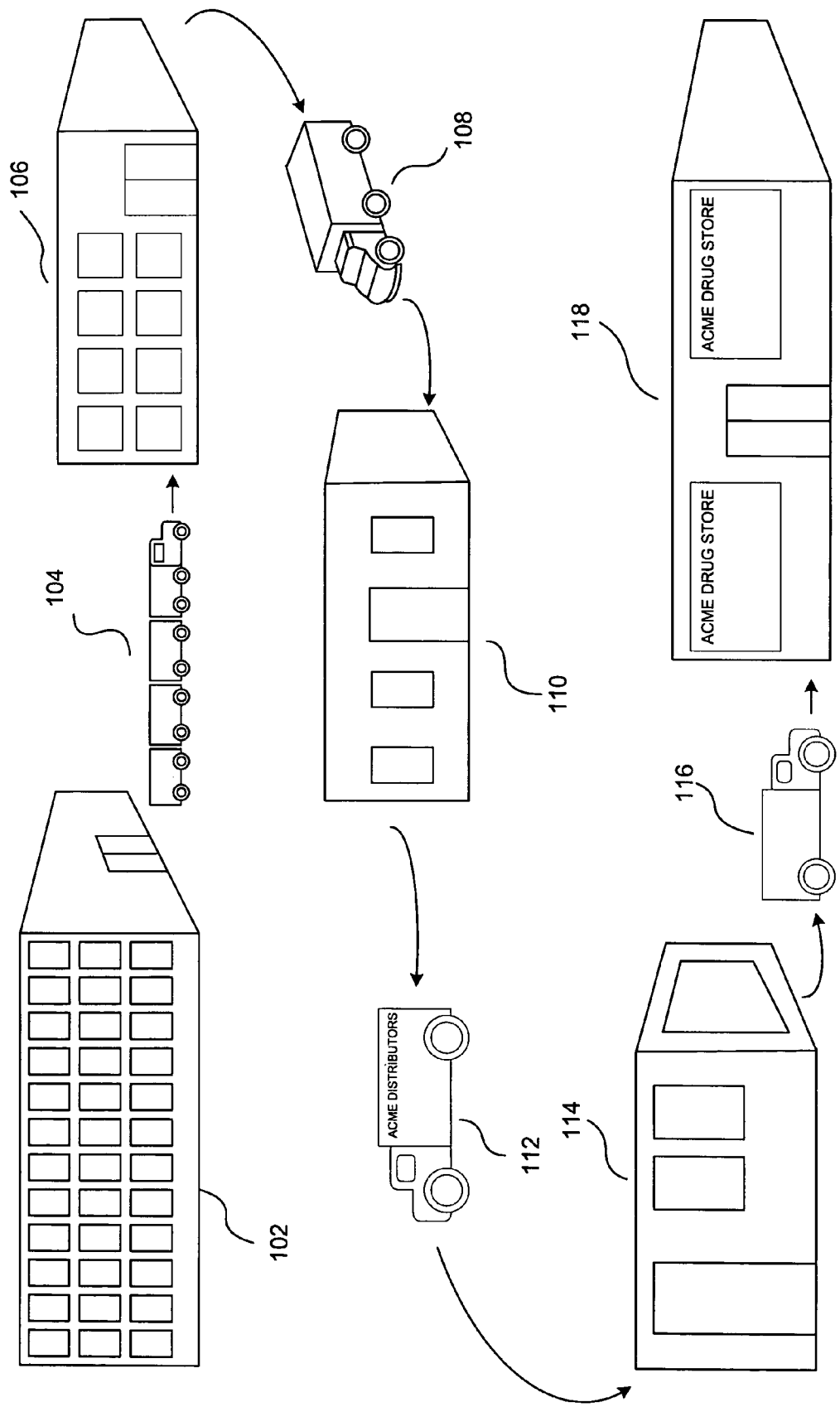
FIGS. 1 and 2 illustrate a pharmaceutical-supply-chain context used, in subsequent subsections, as one context for application of the methods of the present invention.
Figure 2:
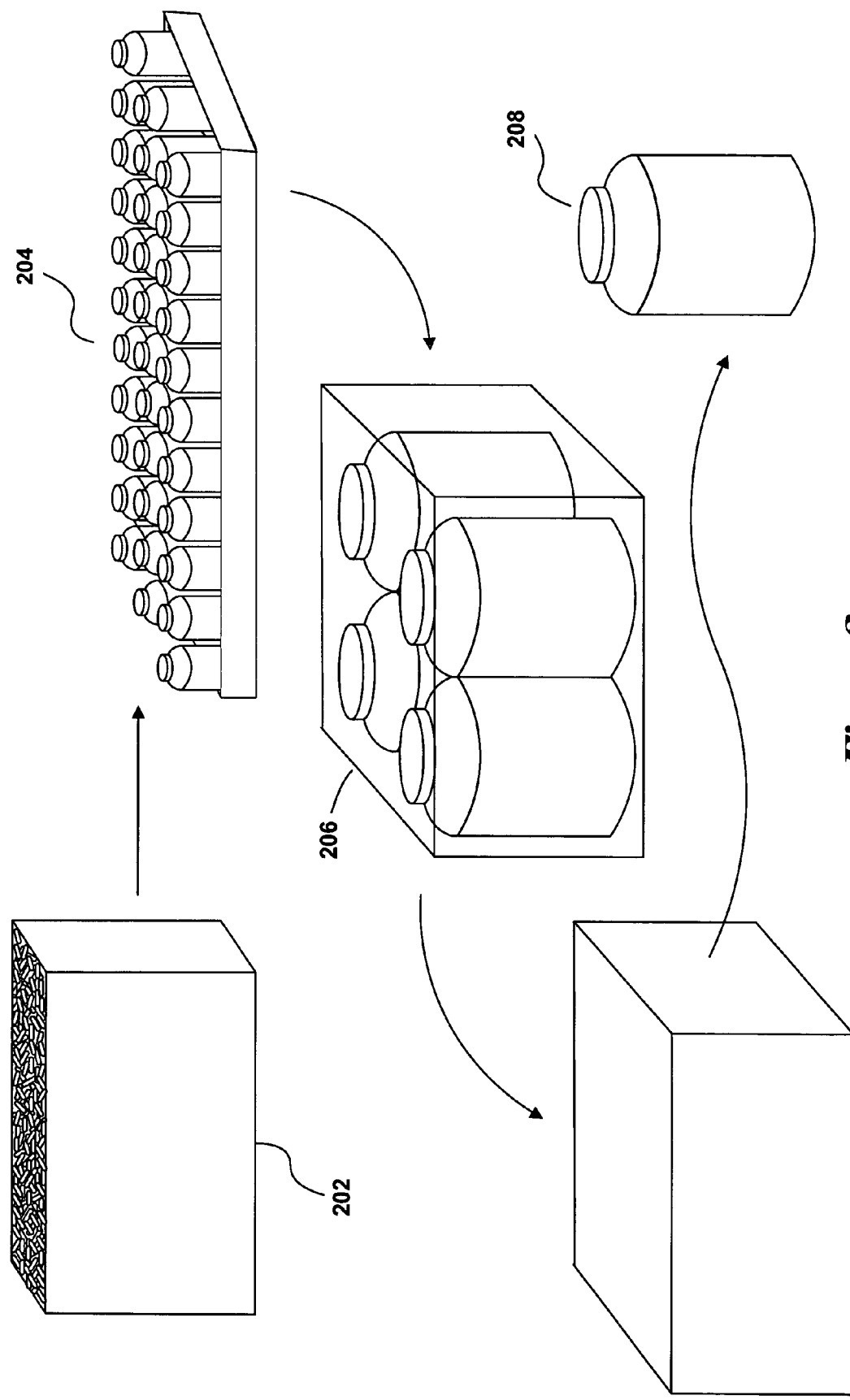
Figure 6:
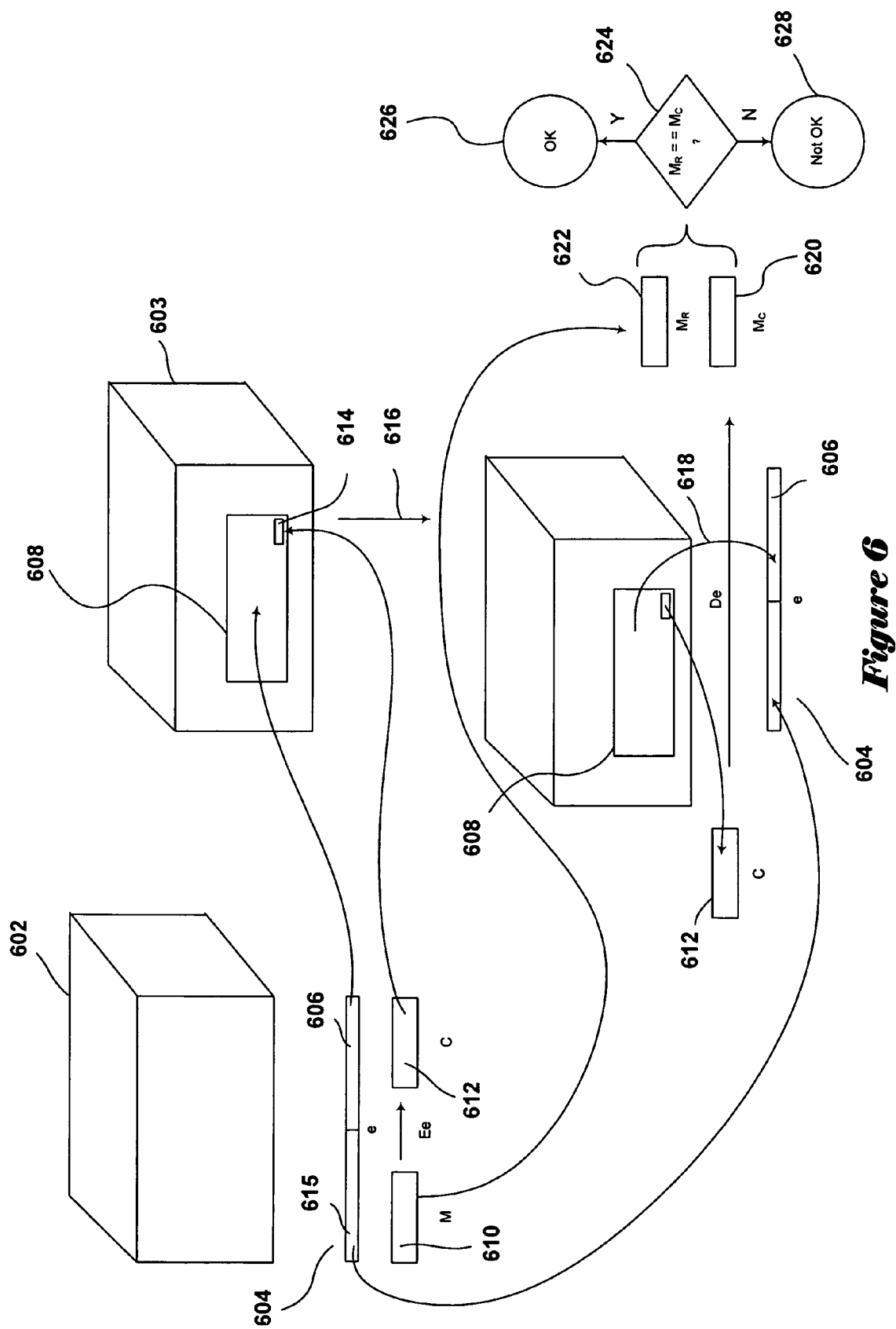
FIG. 6 illustrates a first embodiment of the present invention.

In one embodiment of the present invention, a symmetric encryption key and encryption scheme is used, along with encoding of information in labels, as discussed above with reference to FIGS. 4 and 5A-B, in order to secure shipment of an object through a supply chain. It should be appreciated that a label may be a piece of printed paper, plastic, film, or composite material affixed to a package or object, but may also be information directly incorporated within, or embossed or imprinted on, an object being shipped or packaging enclosing the object. FIG. 6 illustrates a first embodiment of the present invention. The source point in the supply chain prepares an object for shipment 602. The source point then determines, perhaps by a random or pseudorandom method, a particular symmetrical encryption key e 604. The source point encodes one portion 606 of the symmetrical encryption key into a printed label 608 that is affixed to the shipment 602. The source point also devises a message 610 M and uses the encryption key e to encrypt the message to an encrypted form C 612. The encrypted message C is also placed onto the label 614, either in a directly readable form, or using the encoding method discussed above with reference to FIGS. 4 and 5A-B. The object 602 is then shipped 616 to the destination point, generally through a series of intermediate points, such as distributors. At the destination point, the portion 606 of the encryption key e encoded in the label 608 is extracted and combined with the remainder of the encryption key e 615 directly transmitted to, or revealed to, the destination point by the source point. This allows the destination point to reassemble the entire, intact encryption key e 604. The destination point also extracts the encrypted message C 612 from the label 608, and uses the reconstructed encryption key e to decrypt 618 the encrypted message to produce a computed version of the original message, $M_C$ 620. The destination point receives, directly from the source point, a copy 622 of the plain-text message M, labeled $M_R$ in FIG. 6, and compares 624 the computed version of the original message, $M_C$, to the directly received copy $M_R$ of the plain-text message. If $M_R$ is equal to $M_C$, then the shipment is deemed authenticated 626, and is otherwise deemed invalid, or not authenticated 628. Note that the source point, in the pharmaceutical-supply-chain context discussed above with reference to FIGS. 1 and 2, the manufacturer, may wait for some period of time before revealing the plain-text message M to the destination point, generally the expected time of delivery, to prevent attempts to forge labels by counterfeiters or other entrusted intermediate points in the supply chain.

Figure 7:
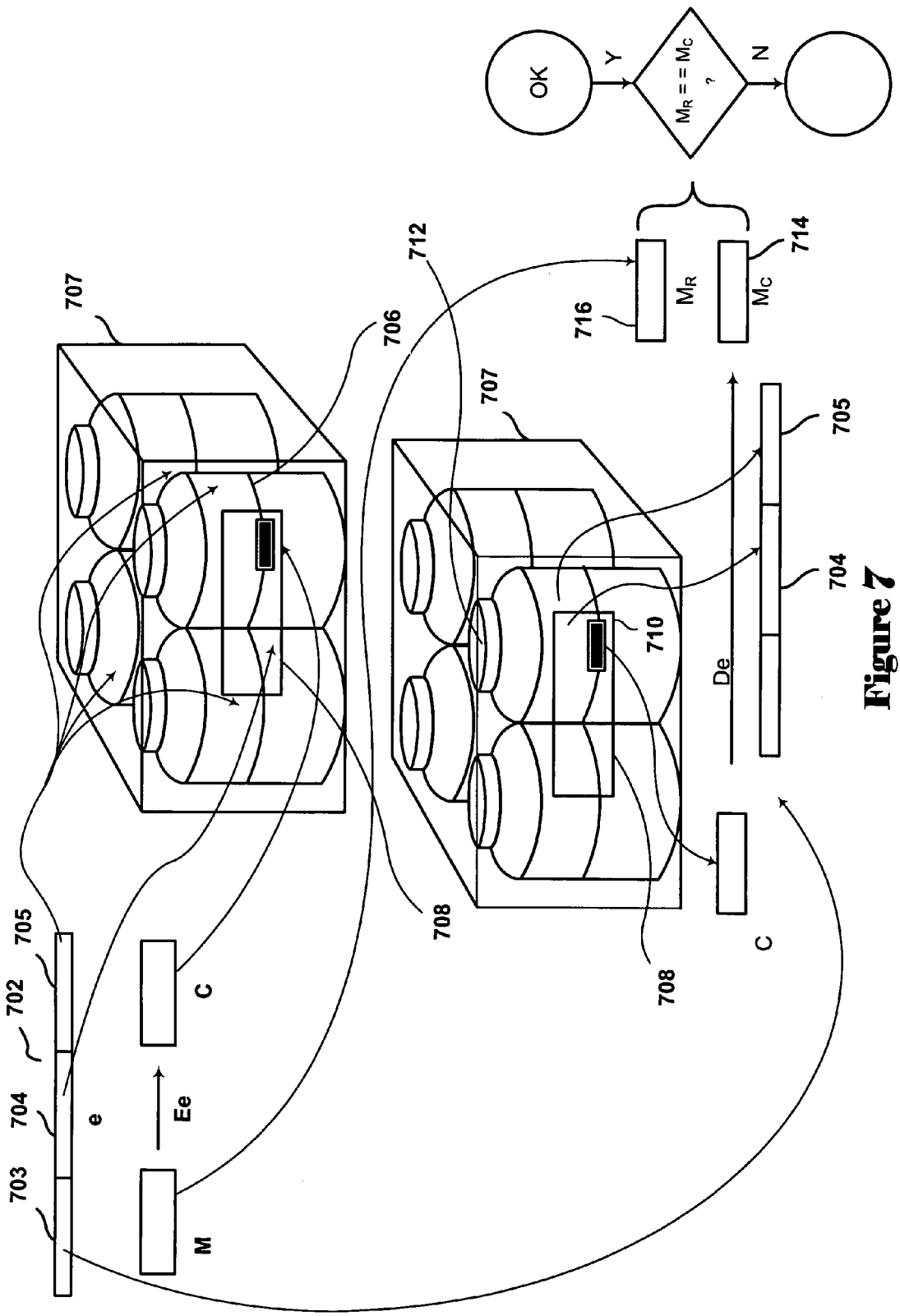
FIG. 7 shows an alternative embodiment of the present invention, similar to the first embodiment illustrated in FIG. 6.

FIG. 7 shows an alternative embodiment of the present invention, similar to the first embodiment illustrated in FIG. 6. In the embodiment shown in FIG. 7, the encryption key e 702 is divided into three different portions 703-705. One portion 705 is incorporated into the labels of pharmaceutical-containing bottles, such as label 706. Another portion of the encryption key 704 is encoded into a label 708 affixed to a package containing bottles of the pharmaceutical. When the shipment is received at a destination node, one portion 705 of the encryption key is extracted from a bottle label 710, and another portion 704 of the encryption key e is extracted from the label 708 affixed to the package containing the pharmaceutical bottles. Reconstruction of the encryption key e and decryption of the encrypted message C provides a computed, plain-text message $M_C$ which can be compared with a copy of the message $M_R$ 716 received directly from the source node to authenticate the particular bottle 712 from which a portion 705 in the encryption key was extracted within the package 707. In other words, by placing portions of the encryption key in different nested levels of packaging, the objects within the most deeply nested level of packaging can be authenticated. The same technique can be used to individually authenticate each pharmaceutical bottle within the package. Similarly, although not shown in FIG. 7, a portion of the encryption key may be incorporated within a pill or gelatin capsule in order to authenticate individual pills and gelatin capsules, in the pharmaceutical-supply-chain context discussed above with reference to FIGS. 1 and 2.

Figure 8:
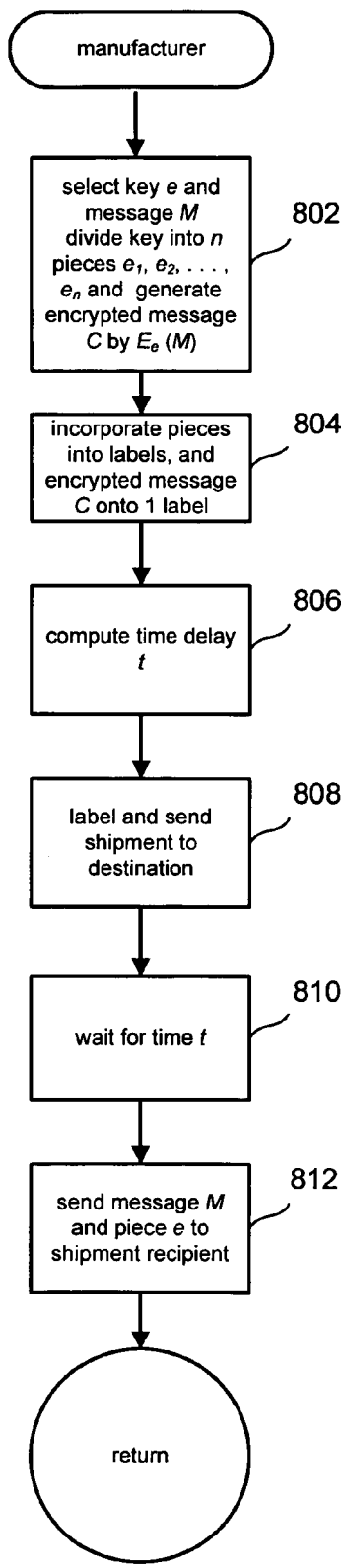
FIG. 8 is a control-flow diagram representing steps undertaken by a source point, or manufacturer, in order to secure a shipment according to one embodiment of the present invention.

FIG. 8 is a control-flow diagram representing steps undertaken by a source point, or manufacturer, in order to secure a shipment according to one embodiment of the present invention. In step 802, the source point selects a symmetrical encryption key e, a plain-text message M, and divides the key into n pieces, $e_1, e_2, \ldots e_n$. In addition, the source point generates an encrypted version of the message M, referred to as C, using the selected encryption key e. The source point, in step 804, then incorporates at most n−1 portions of the encryption key into n−1 labels or n−2 labels and each packaged object, includes the encrypted message C in at least one label, and labels the shipment using the labels, preserving at least one portion of the encryption key $e_1$ as a secret. Next, in step 806, the source point determines a time delay t to wait before revealing the plain-text message M to the destination node. In step 808, the shipment is sent into the supply chain for eventual delivery to the destination point. In step 810, the source point waits for the pre-computed time t. Finally, in step 812, the source point sends or reveals the plain-text message M and the portions of the encryption key not incorporated in the shipment, including key-portion $e_1$, to the shipment recipient.

Figure 9:
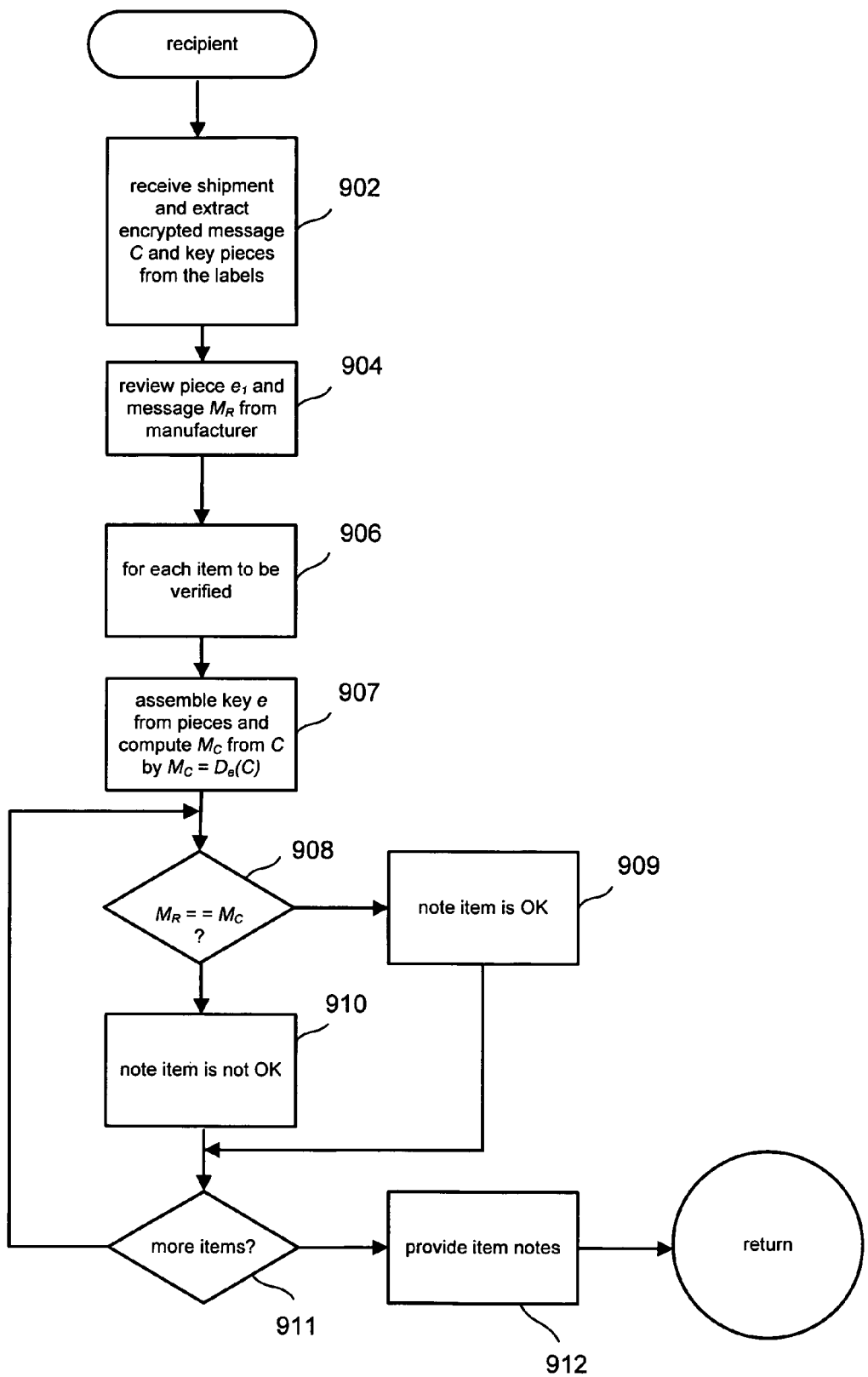
FIG. 9 is a control-flow diagram representing steps undertaken by a shipment recipient in order to authenticate a shipment according to one embodiment of the present invention.

FIG. 9 is a control-flow diagram representing steps undertaken by a shipment recipient in order to authenticate a shipment according to one embodiment of the present invention. In step 902, the recipient receives the shipment and extracts from labels or objects within the shipment the encrypted message C and the portions of the encryption key incorporated within the shipment. As discussed above, the encryption keys and, optionally, the encrypted message C may be encoded by printing-feature variants used to print labels. Then, in the for-loop of steps 906-911, the recipient of this shipment may individually authenticate each item at the deepest level of key-portion incorporation within the shipment. First, in step 907, the encryption key e is reassembled from portions of the encryption key extracted from the labels and objects within a shipment and from a remaining portion or portions of the encryption key, including key-portion $e_1$, directly received from the source point. The reassembled encryption key is then used to decrypt encrypted message C to produce a computed, plain-text message $M_C$. In step 908, the shipment recipient determines whether the computed plain-text message $M_C$ is equal to a copy of the plain-text message $M_R$ directly received from the source point. If the two are identical, as determined in step 908, then the item is noted to have been authenticated, in step 909. Otherwise, the item is noted to not be authenticated, in step 910. When no more items remain to be authenticated, as determined in step 911, the indications of whether items are authenticated or not are provided 912 to allow individual items to be accepted or rejected by the shipment recipient.

A different encryption key e key and message are generally used for each shipment, to prevent counterfeiters from intercepting the key and/or message in order to defeat authentication in a future shipment. The message may be altered by appending random bits to a previously used message.

Although the present invention has been described in terms of particular embodiments, it is not intended that the invention be limited to these embodiments. Modifications within the spirit of the invention will be apparent to those skilled in the art. For example, any of a large number of different encryption techniques may be used, providing that the encryption techniques use an encryption key that may be encoded into packaging labels and into packaged objects. Encryption schemes that use more than one key may also be used, such as public-key encryption schemes. The source point, or manufacturer, may wait for any of various different times before revealing the plain-text message and encryption-key piece to the destination point, depending on various considerations. In many cases, the plain-text message may be revealed ahead of time, since lacking the encryption-key piece withheld by the source point, a counterfeiter would be unable to produce labeling that would allow the destination point to reconstruct a valid encryption key. Encryption keys may be encoded by the method discussed above with reference to FIGS. 4 and 5A-B, but may be encoded in other ways, such as electronically encoded into electronic devices associate with the shipment, or may be directly numerically or textually printed on labels, objects, packaging, or other portions of the shipment. The authentication method of the present invention may be used for authentication of a shipment between any two points in a supply chain, including between a first intermediate point, such as a distributor, and a second intermediate point, such as another distributor. Encryption keys and labels may be prepared by entities other than source points for use by source and destination points. Although a pharmaceutical-supply-chain context is used for the above description of the present invention, the method of the present invention may be used to secure shipment of any type of object, including electronic transmission of information objects through networks.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for authenticating a shipment, the method comprising:
   devising an encryption key e;
   using the encryption key e to encrypt a message to produce an encrypted message;
   dividing the encryption key into n portions;
   encoding, by a computer system, at most n−1 portions of the encryption key into one or more labels within the shipment; and
   subsequently making the message, and any encryption-key portions not incorporated within the shipment, available for access,
   wherein making the message, and any encryption-key portions not incorporated within the shipment, available for access further includes one or more of:
       electronically transmitting the message and any encryption-key portions not incorporated within the shipment to a recipient of the shipment;
       publishing the message and any encryption-key portions not incorporated within the shipment on the Internet;
       broadcasting the message and any encryption-key portions not incorporated within the shipment on a publicly available communications medium; and
       sending the message and any encryption-key portions not incorporated within the shipment by mail, package service, or overnight delivery service to a recipient of the shipment.

2. The method of claim 1 further comprising shipping the shipment to a destination through a supply chain prior to subsequently making the message, and any encryption-key portions not incorporated within the shipment, available for access.

3. The method of claim 1 further comprising:
   at a destination point,
       extracting the at most n−1 portions of the encryption key from the one or more labels and/or objects within the shipment;
       reassembling the encryption key e from the extracted portions and the available encryption-key portions;
       extracting the encrypted message from the shipment;
       using the reassembled key e to decrypt the extracted encrypted message to produce a computed message; and
       comparing the computed message to the available message to determine whether or not the most deeply nested object or label within the shipment from which a key-portion has been extracted is authentic.

4. The method of claim 3 wherein the encryption key e is a symmetrical encryption key.

5. The method of claim 4 wherein an encryption-key portion is encoded into a label within the shipment by one or more of:
   imprinting the encryption-key portion in numeric form onto the label;
   electronically encoding the encryption-key portion in an electronic device included in the label; and
   encoding the encryption-key portion in printing-feature variants used to print the label.

6. A method for authenticating a shipment, the method comprising:
   extracting, by an electronic label reader and associated computer system, at most n−1 portions of an encryption key e from one or more labels within the shipment;
   assembling, by the computer system, an encryption key e from the extracted portions and one or more encryption-key portions made available after the shipment was shipped;
   extracting, by the electronic label reader and the associated computer system, an encrypted message from the shipment;
   using, by the computer system, the assembled key e to decrypt the extracted encrypted message to produce a computed message; and
   comparing, by the computer system, the computed message to a message made available after the shipment was shipped to determine whether or not a most deeply nested label within the shipment from which a key-portion has been extracted is authentic.

7. The method of claim 6 further comprising:
   prior to shipping the shipment,
       devising the encryption key e;
       using the encryption key e to encrypt a message to produce the encrypted message;
       dividing the encryption key e into n portions;
       encoding at most n−1 portions of the encryption key into one or more labels within the shipment; and subsequently making the message and any encryption-key portions not incorporated within the shipment available.

8. The method of claim 7 further comprising shipping the shipment to a destination through a supply chain prior to subsequently making the message, and any encryption-key portions not incorporated within the shipment, available for access.

9. The method of claim 8 wherein making the message, and any encryption-key portions not incorporated within the shipment, available for access further includes one or more of:
electronically transmitting the message and any encryption-key portions not incorporated within the shipment to a recipient of the shipment;
publishing the message and any encryption-key portions not incorporated within the shipment on the Internet;
broadcasting the message and any encryption-key portions not incorporated within the shipment on a publicly available communications medium; and
sending the message and any encryption-key portions not incorporated within the shipment by mail, package service, or overnight delivery service to a recipient of the shipment.

10. The method of claim 7 wherein the encryption key e is a symmetrical encryption key.

11. The method of claim 7 wherein an encryption-key portion is encoded into a label within the shipment by one or more of:
imprinting the encryption-key portion in numeric form onto the label;
electronically encoding the encryption-key portion in an electronic device included in the label; and
encoding the encryption-key portion in printing-feature variants used to print the label.

* * * * *